United States Patent [19]

Lemmens

[11] Patent Number: 4,554,882

[45] Date of Patent: Nov. 26, 1985

[54] FENDER SYSTEM

[75] Inventor: Rudolphus P. M. Lemmens, Dieren, Netherlands

[73] Assignee: Vredestein N.V., Velp, Netherlands

[21] Appl. No.: 450,411

[22] Filed: Dec. 16, 1982

[30] Foreign Application Priority Data

Dec. 23, 1981 [NL] Netherlands .......................... 8105818

[51] Int. Cl.$^4$ ............................................. B63B 21/00
[52] U.S. Cl. .................................... 114/219; 405/212; 405/215
[58] Field of Search ............... 114/219, 266, 267, 215; 405/212; 411/529; 267/140

[56] References Cited

U.S. PATENT DOCUMENTS

| 2,857,872 | 10/1958 | Usab | 114/266 |
| 3,339,907 | 9/1967 | Parker | 114/219 |
| 3,418,816 | 12/1968 | Kumazawa | 114/219 |
| 3,457,729 | 7/1969 | Wanneroy | 114/219 |
| 3,661,359 | 5/1972 | Walker | 114/219 |
| 3,799,098 | 3/1974 | Taylor | 114/219 |
| 3,863,589 | 2/1975 | Guienne et al. | 114/219 |
| 4,124,986 | 11/1978 | Postma | 114/219 |
| 4,158,082 | 6/1979 | Belousofsky | 114/357 |
| 4,319,539 | 3/1982 | Fujii | 114/219 |
| 4,355,484 | 10/1982 | Mandish | 47/58 |

FOREIGN PATENT DOCUMENTS

| 407418 | 2/1968 | Australia . | |
| 809950 | 4/1969 | Canada | 114/219 |
| 7403892 | 9/1974 | Netherlands . | |
| 1431672 | 4/1976 | United Kingdom . | |

OTHER PUBLICATIONS

"Massa-Produktie van Geprefabriceerde Voorgespannen Betonpalen (II)", B. Gerwick, Cement, vol. 21, Jan. 1969, Amsterdam.

Primary Examiner—Sherman D. Basinger
Attorney, Agent, or Firm—Karl W. Flocks; Sheridan Neimark; A. Fred Starobin

[57] ABSTRACT

Fender system comprising at least one absorbing body of elastomer material, which can be secured directly or indirectly to a quay or a jetty, and a front plate which is parallel in essentially a vertical plane to the plane of the quay or the jetty, and is provided at the other side of the absorbing body, which front plate can come into touch with an object such as a ship moving towards the front plate, the front plate serving for distributing and transferring the loads exerted by this object on the absorbing body, the front plate being made of reinforced concrete so that it can be connected with other parts as e.g. sliding strips during and/or after the casting thereof.

2 Claims, 4 Drawing Figures

FENDER SYSTEM

BACKGROUND OF THE INVENTION

The invention relates to a fender system comprising at least one absorbing body of an elastomer material, which can be secured directly or indirectly to a quay or a jetty, and a front plate, which is parallel in essentially a vertical plane to the plane of the quay or the jetty, and is provided at the other side of the absorbing body, with a front plate which can come into touch with an object such as a ship moving towards the front plate, the front plate serving for distributing and transferring the loads exerted by this object on the absorbing body.

Such fender systems are used on a large scale for mooring ships, in order to prevent the quay, the jetty or the ship concerned from being damaged.

With these known fender systems the front plate consists in general of a steel construction, built up of a number of profiles welded to one another. When the absorbing body of the fender system consists of a hollow cylindrical body, of which the centre line is at a right angle to the plane of the front plate, the rear side of the front plate consisting of the steel construction can be secured e.g. by means of bolts, to a flange plate, which may be one whole with the absorbing body, or the front plate may lie against the absorbing body in a different force-transferring manner. A connection by means of bolts can be used also with other embodiments of the absorbing body.

It is possible to connect the steel construction e.g. by means of chains with the quay or the jetty, in such a way that within certain limits the front plate can move with respect to the quay or the jetty when transferring the forces exerted on the front plate to the absorbing body.

Also in the case that the front plate is connected through the absorbing body with the quay or the jetty, some chains may be provided between the front plate and the quay or the jetty, in such a way that the absorbing body can be relieved from the weight of the front plate, whereas on the other hand the movement of the front plate in the horizontal direction and thereby the deformation of the absorbing body can be limited.

The manufacture of the front plate described above requires a great amount of labour, as the profiles must be cut to size, welded to one another, provided with fastening points for the chains and possible other parts, etc. It will not always be possible to provide the fastening points for the chains at the best possible place, because of the position of the profiles.

As such a front plate will be exposed to a high extent to the effects of air and water, there will be a major risk of corrosion of such a front plate consisting of a steel construction. The front plate must be protected against this corrosion by means of metallization or painting, and after a certain service time an inspection of the steel construction will have to take place in order to see whether it still meets the requirements.

SUMMARY OF THE INVENTION

It is the purpose of the present invention to overcome the drawbacks of the known front plate by providing a front plate, which is made of reinforced concrete, the mould into which the concrete is cast, being carried out in such a way, that the concrete can be connected with other parts during and/or after the casting thereof.

It has appeared that many drawbacks of the known front plates are overcome by using reinforced concrete. The place for fastening the chains and other connection means can be chosen almost arbitrarily, so that an optimal force transfer from the front plate to the absorbing body can be achieved.

Furthermore, a concrete front plate requires a minimum of maintenance, but in order to prevent corrosion of the reinforcement rods, as a result of capillary fissures and the like in the concrete, the reinforcement rods will be manufactured preferably, according to the invention, from a stainless material.

As a stainless material e.g. glass fibres can be thought of, which are completely resistant to corrosion. Any flaws in the concrete, caused during the casting, can be repaired immediately by injecting concrete, so that the front plate can have a long service life.

It will be obvious that also when smaller numbers of fender systems with a reinforced concrete front plate are manufactured, the front plates concerned can be manufactured inexpensively, as a mould is relatively easy to make.

As a ship being moored will in most cases have a speed at a right angle to the plane of the quay or jetty, as well as parallel thereto, gliding strips will be provided on the front plate, in order to reduce as much as possible the friction between the front plate and the ship coming into touch with it, i.e. the ship coming in contact with the fender system will contact and slide against the gliding strips which form the exterior surface of the front plate of the fender system. These gliding strips will be made in general of wood or of a synthetic material, as such materials have a low friction coefficient. The advantage of synthetic material is that it requires little or no maintenance.

The fastening of the gliding strips takes place with the known front plate, which consists of a steel construction, by means of bolts of which the heads have to be sunk completely into the material of the gliding strips. As considerable forces are exerted on the gliding strips, the bolts, when few in number, must be heavy, so that the strips must have a considerable thickness, whereas when many small bolts are used, the strips are weakened considerably and must therefore also be of sufficiently heavy dimensions.

According to the present invention it is possible to proceed in such a way, that the gliding strips are secured directly to the front plate by casting them in the concrete.

According to a preferable embodiment it is possible to provide, as seen in the cross direction of the gliding strips, at least one dovetail-shaped projecting part on the surface of the gliding strip which is directed towards the concrete. So this dovetail-shaped part is enclosed in the concrete, so that a firm connection between the concrete and the gliding strip is obtained.

By casting the gliding strips directly in the concrete, the strips do not have to be provided with holes for receiving bolts, so that the part of the gliding strips which protrudes from the concrete, is completely effective as there are no sunk bolt heads and no corrosion of the bolts can occur.

Furthermore, also the fastening means for chains and the like can be secured directly to the front plate by casting them in concrete. The position of these parts can be chosen almost arbitrarily, as observed above.

This mould in which the front plate is cast can be adapted easily to the most desired shape of the front plate. So the front plate can be square or rectangular and also have other shapes, such as e.g. trapezoid or round.

It is also possible to provide the lateral sides of the front plate with a protective coating consisting of profiles of plastic material, in that these profiles can be laid in the mould before the concrete is cast.

When with a fender system according to the invention the absorbing body, in the already known manner described above, is essentially hollow and cylindrical and has its centre line at a right angle to the front plate, this absorbing body can be connected directly with a metal flange plate, which, for the purpose of protection against corrosion, is included entirely in the elastomer material of the absorbing body and which can be connected with the front plate.

According to a further elaboration of the invention, however, it is also possible in this case to cast a projecting part on the rear side of the front plate, which projecting part fits in the absorbing body. When the front plate is connected by means of chains with the quay or jetty, there does not have to be a further connection between the front plate and the absorbing body, as no movement of the front plate with respect to the absorbing body can occur.

It may be observed, that it has already been proposed to make the front plate of a fender entirely of synthetic material. Because of the material costs, the use of a solid plate of synthetic material can be considered only for relatively small fenders. For larger fenders a more composite form of the front plate will have to be used, but the manufacture of the mould necessary therefore is very expensive and therefore only usable for sufficiently large series, whereas the material costs will still be considerable.

Concrete, to the contrary, constitutes an inexpensive material and also a mould for casting concrete is inexpensive to manufacture, as already said above.

If, according to the invention, the front plate is made of reinforced concrete, it may also be considered to make the part of the fender system which is connected with the quay, serving for supporting the absorbing body and possible other parts, of reinforced concrete as well.

When an absorbing body is used in the shape of a hollow cylindrical body with its centre line at a right angle to the front plate, the reinforced concrete part connected with the quay may be provided with a forwards projecting part, which fits in the absorbing body.

The shape of this projecting part may correspond with the shape of the backwards projecting part of the front plate, so that certain elements of the mould for the one part can also be used for the mould of the other part.

It will be obvious that the part connected with the quay can also be a fixed part of the quay when the quay is made of reinforced concrete.

BRIEF DESCRIPTION OF THE DRAWINGS

The invention will now be explained further by means of examples of embodiments, which do not restrict the invention, shown in the drawing, in which.

DESCRIPTION OF THE PREFERRED EMBODIMENTS

Figure 1:
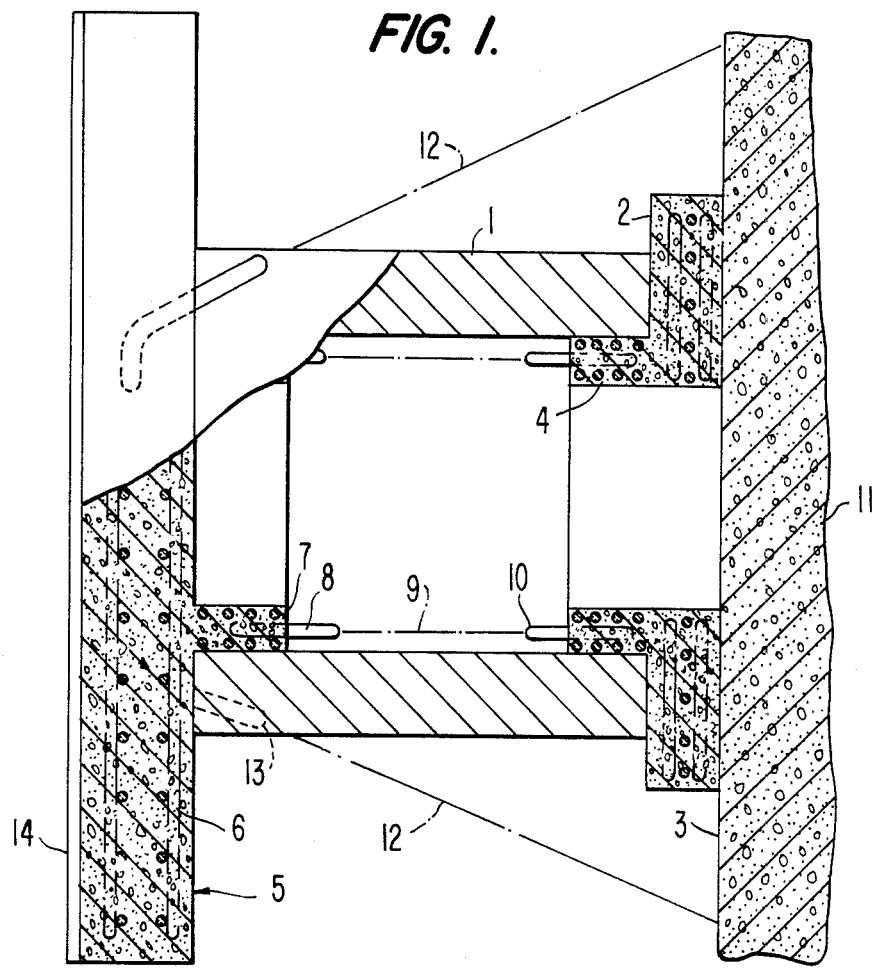
FIG. 1 shows a vertical longitudinal section and a partial view of a fender system according to the invention.

The fender system shown in FIG. 1 comprises a hollow, essentially cylindrical absorbing body 1, of elastomer material, such as e.g. rubber. The absorbing body 1 is connected at the one side with a flange plate 2, which is made of reinforced concrete and which, e.g. by means of unshown bolts, is secured to a quay 3. The flange plate 2 has an annular projecting part 4, over which the absorbing body 1 fits.

The other end of the absorbing body 1 is provided with the front plate 5, which is also made of reinforced concrete. Both with the flange plate 2 and the front plate 5 the reinforcement rods 6 may consist of glass fibre rods, which will not corrode, not even if there were small cracks in the concrete. The glass fibre rods consist in a known way of glass fibres, which are bundled into rods by means of epoxy resin.

The front plate 5 is provided with a projecting annular part 7, which fits in the absorbing body 1. In the annular part 7 are provided anchors 8, which by means of chains 9 are connected with anchors 10, which are provided in the annular part 4 of the flange plate 2. In this way the absorbing body 1 can be accomodated between the flange plate 2 and the front plate 5, without a further connection between said parts being necessary. The flange plate 2 is provided furthermore with the opening 11 for mounting the chains 9.

The flange plate 2 may possibly be part of the quay 3 if the latter is made of reinforced concrete. It is also possible to provide the cylindrical absorbing body 1 at one or both ends with flanges, e.g. in the form of metal plates, which for the connection with the absorbing body 1 are incorporated entirely in the elastomer material thereof, in such a way that they are also protected against corrosion. The flanges can then be connected with the quay or jetty 3 and/or with the front plate 5 by means of bolts cast in the concrete.

For the suspension of the weight of the front plate 5, in such a way that this weight does not come to hang entirely on the absorbing body, serve chains 12, which on the one hand are secured to the quay 3 and on the other hand to the front plate 5 by means of anchors 13 cast in the concrete of the front plate.

Figure 2:
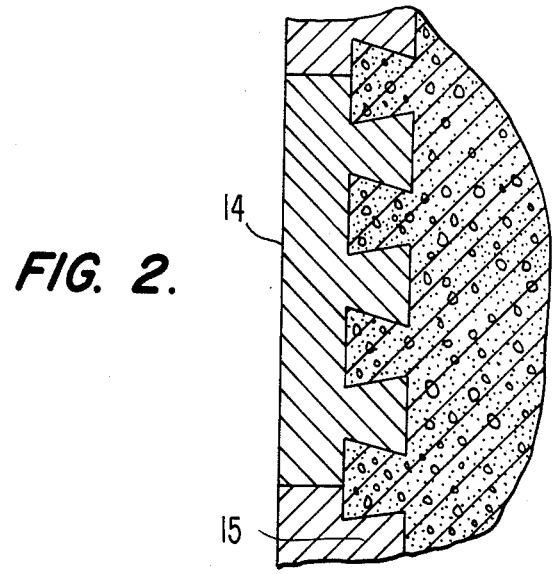
FIG. 2 shows a cross section, at an enlarged scale, over a part of the front plate with a number of gliding strips connected therewith.

Finally the front side of the front plate is provided with gliding strips 14, of which some are shown in section in FIG. 2. As the Figure shows, each gliding strip is provided with dovetail-shaped anchoring parts 15, which are included in the concrete, whereas the special shape of the anchoring parts gives a good connection between the gliding strips and the concrete. Of course another adapted shape of the gliding strips is also possible.

The anchors 8 and 13 and the gliding strip 14, of course together with the reinforcement rods 6, can be mounted in the mould before the concrete is cast therein. After the casting of the concrete and the setting thereof, the front plate is ready for immediate use.

Figure 3:
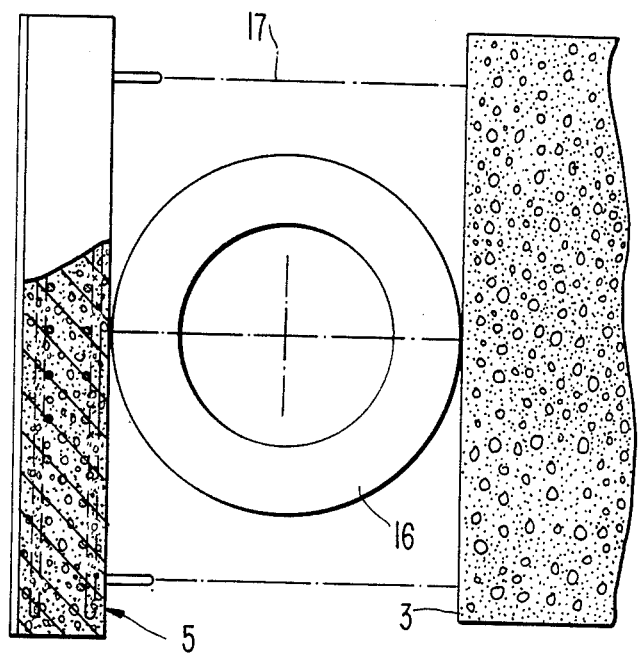
FIG. 3 shows a view and a partial vertical section over another embodiment of a fender system according to the invention.

With the embodiment according to FIG. 3, there is between the front plate 5 and the quay 3 a hollow cylindrical absorbing body 16, which absorbing body, however, now lies with its longitudinal axis in a plane parallel with the plane of the front plate 5. The absorbing body 16 is held between the front plate and the quay, in that the front plate is connected with the quay by means of chains 17 in the way as already described above by means of FIG. 1.

Figure 4:
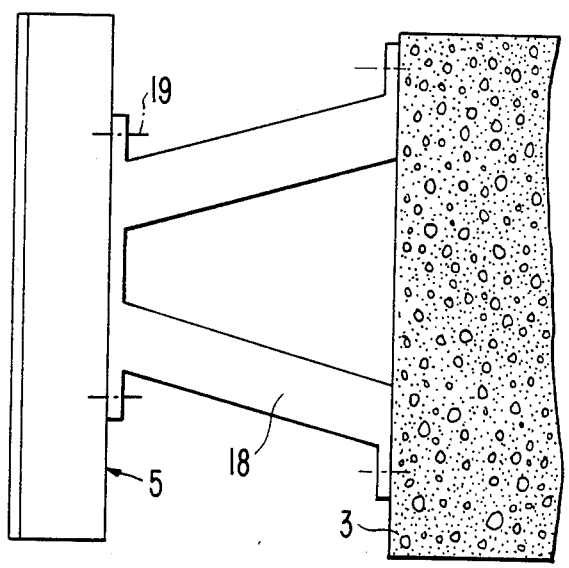
FIG. 4 shows a view of still another embodiment.

Finally, FIG. 4 shows another embodiment, in which the front plate 5 is connected with the quay 3 through a trapezoid absorbing body 18, for which purpose use is made of bolts 19.

It will be obvious that only a few possible embodiments of the invention have been described and shown in the drawing, and that numerous modifications can be made without leaving the scope of the invention.

It is possible e.g. to connect the front plate 5 with more than one absorbing body, in which case the front plate may have e.g. an oblong or an oval shape, whereas the front plate may also be round, e.g. in the case of a hollow, cylindrical absorbing body is shown in FIG. 1. Instead of the hollow trapezoid shape as shown in FIG. 4, such as absorbing body can also be solid, but all these possibilities will be obvious to the expert.

I claim:

1. A fender system for mounting on a quay or jetty comprising
    at least one absorbing body of elastomer material adaptable for attachment to the quay or jetty,
    a front plate which is parallel in essentially a vertical plane to a vertical wall of the quay or jetty attached to said absorbing body on its end away from the quay or jetty where it can come into touch with an object such as a ship moving towards the quay or jetty,
    said front plate being made of cast reinforced concrete and being shaped and located for distributing and transferring the loads exerted by the object on the absorbing body,
    at least one other part being connected with the cast reinforced concrete of said front plate by having a portion of said at least one other part cast in said reinforced concrete of said front plate,
    one said parts being a gliding strip having a low friction coefficient of non-corrosive material with a back side connected to said front plate by a dovetailed surface cast in the reinforced concrete of said front plate,
    another of said parts being an anchor means embedded in said reinforced concrete for connection to the quay or jetty by a chain means to support at least a portion of the weight of said cast reinforced concrete front plate, and
    a concrete flange plate connected with the quay or jetty and having an annular projecting portion projecting within said at least one absorbing body.

2. A fender system for mounting on a quay or jetty comprising:
    at least one absorbing body of elastomer material adaptable for attachment to the quay or jetty,
    a front plate which is parallel in essentially a vertical plane to a vertical wall of the quay or jetty attached to said absorbing body on its end away from the quay or jetty where it can come into touch with an object such as a ship moving towards the quay or jetty,
    said front plate being made of cast reinforced concrete and being shaped and located for distributing and transferring the loads exerted by the object on the absorbing body,
    at least one other part being connected with the cast reinforced concrete of said front plate by having a portion of said at least one other part cast in said reinforced concrete of said front plate,
    one said parts being a gliding strip having a low friction coefficient of non-corrosive material with a back side connected to said front plate by a dovetailed surface cast in the reinforced concrete of said front plate, and
    another of said parts being an anchor means embedded in said reinforced concrete for connection to the quay or jetty by a chain means to support at least a portion of the weight of said cast reinforced concrete front plate.

* * * * *